United States Patent [19]

Zittel

[11] Patent Number: 5,327,817
[45] Date of Patent: Jul. 12, 1994

[54] FOOD MACHINERY WITH AGITATING FLIGHT AUGER

[75] Inventor: David R. Zittel, Columbus, Wis.

[73] Assignee: Lyco Manufacturing, Inc., Columbus, Wis.

[21] Appl. No.: 121,731

[22] Filed: Sep. 15, 1993

[51] Int. Cl.⁵ .................. A23L 3/00; A23N 12/00; A47J 37/12; F25D 25/02
[52] U.S. Cl. .................................. 99/348; 62/381; 99/360; 99/404; 99/409; 99/516; 134/65; 134/132; 366/81; 366/234; 366/319
[58] Field of Search .......... 99/348, 360, 365, 403, 99/404, 409, 450, 483, 487, 516, 534, 536, 477-479, 443 C; 366/81, 101, 102, 234, 318, 319; 134/65, 132; 62/381; 100/117, 145

[56] References Cited

U.S. PATENT DOCUMENTS

| | | |
|---|---|---|
| 2,182,556 | 12/1939 | Griswold . |
| 2,314,871 | 3/1943 | DeBack ................ 134/65 |
| 2,597,515 | 5/1952 | Nitsch . |
| 2,909,872 | 10/1959 | Kearney et al. ............ 134/132 |
| 3,135,668 | 6/1964 | Wesson ................ 134/132 |
| 3,484,360 | 12/1969 | Sandrock ............ 366/234 |
| 3,760,714 | 9/1973 | Lortz ................ 99/404 |
| 3,924,839 | 12/1975 | Millauer ............ 366/319 |
| 3,945,622 | 3/1976 | Sokolow . |
| 4,092,015 | 5/1978 | Koch ................ 366/81 |
| 4,410,553 | 9/1983 | McGinty ................ 99/348 |
| 4,627,735 | 12/1986 | Rose et al. ............ 366/81 X |
| 4,688,476 | 8/1987 | Zittel . |
| 4,733,607 | 3/1988 | Star et al. ............ 366/319 X |
| 4,875,344 | 10/1989 | Zittel . |
| 4,942,810 | 7/1990 | Zittel et al. . |
| 4,980,724 | 12/1990 | Tanaka ................ 366/319 |
| 5,071,256 | 12/1991 | Smith et al. . |
| 5,133,249 | 7/1992 | Zittel . |
| 5,146,841 | 9/1992 | Zittel . |

Primary Examiner—Timothy F. Simone
Attorney, Agent, or Firm—Lathrop & Clark

[57] ABSTRACT

A food processing apparatus such as a cooler, blancher, or cooker, has a water tank with a perforated wall drum cylinder mounted to rotate within the tank. Loose or pouch-packaged food product is introduced into the rotating cylinder and is advanced by the generally helical auger to the discharge end of the tank. The auger has radially extending folds or depressions which project axially from the auger helical surface, such that food product conveyed by the rotating auger is engaged by the projecting portions and is thereby agitated in an axial direction as it is conveyed from the tank inlet to the tank outlet. In a preferred embodiment, the depressions are disposed at 90 degrees from one another along the entire length of the auger, alternately projecting toward the inlet and the outlet.

12 Claims, 4 Drawing Sheets

FOOD MACHINERY WITH AGITATING FLIGHT AUGER

FIELD OF THE INVENTION

This invention relates to apparatus for processing food in general, and to rotating auger advanced food heating and cooling apparatus in particular.

BACKGROUND OF THE INVENTION

Many food products, before they can be packaged or consumed, must be subjected to a variety of heat treating processes. The product may need to be blanched, cooled, or cooked, or may require multiple heat treatments. Large quantities of product may be treated in a rotating drum with an internal auger for advancement of the product through a heated or cooled water bath. The efficiency of the process, as well as the time which is consumed in properly heating or cooling the product, depends on the heat transfer rate between the treated product and the surrounding liquid. An increased rate of heat transfer means a decreased retention time of the product required within the treatment apparatus, and hence allows a greater throughput for a given size machine.

It has been found that agitation of food product with a significant thickness, such as animal organs, or pouches of liquid or semi-liquid product, results in improved heat transfer. As disclosed in my prior U.S. Pat. No. 4,875,344 for a CHILLER, axially extending baffles, peripherally mounted to the rotating auger flights of a drum are effective in imparting some agitation to a conveyed food product. Peripheral baffles, however, will only engage food product of negative buoyancy, that is product which resides within the lower regions of the rotating drum. Product which is of positive or neutral buoyancy, and which therefore floats within the water may avoid contact with peripheral baffles.

What is needed is a rotating drum food processing apparatus which promotes improved heat transfer of treated products of both positive, negative, and neutral buoyancy.

SUMMARY OF THE INVENTION

The food processing apparatus of this invention has an auger which agitates the product conveyed through the apparatus in an axial direction. The apparatus is a cooler, blancher, or cooker which has a tank having an inlet end and a discharge end. A perforated cylinder is mounted rotatably within the tank so that water contained in the tank will enter the cylinder. The cylinder has an inlet opening near the inlet end of the tank for receiving introduced food product and a discharge opening near the discharge end of the tank where food product which has moved through the cylinder can be discharged from the tank. The agitating auger is positioned substantially within the perforated cylinder to rotate with the cylinder, and has portions which define a helical surface which extends from a position proximate the tank inlet end to a position proximate the tank outlet end. The helical auger is bent in manufacturing along radial lines to form portions of the auger which project axially from the helical surface. These portions in the form of grooves or projections engage food product conveyed by the rotating auger and cause it to be agitated in an axial direction as it is conveyed from the tank inlet to the tank outlet. In a preferred embodiment, the depressions are disposed at 90 degrees from one another along the entire length of the auger, alternately projecting toward the inlet and the outlet. This axial agitation promotes heat transfer between the water in the tank and the food product, particularly liquid or semi-liquid products in pouches.

It is an object of the present invention to provide a food processing apparatus with improved heat transfer efficiency.

It is also an object of the present invention to provide a apparatus for treating food which conveys the food through a liquid bath with continuous agitation in the direction of product movement.

It is another object of the present invention to provide a food processing apparatus which agitates the treated food product in a non-disruptive manner.

Further objects, features, and advantages of the invention will be apparent from the following detailed description when taken in conjunction with the accompanying drawings.

DESCRIPTION OF THE PREFERRED EMBODIMENT

Figure 1:
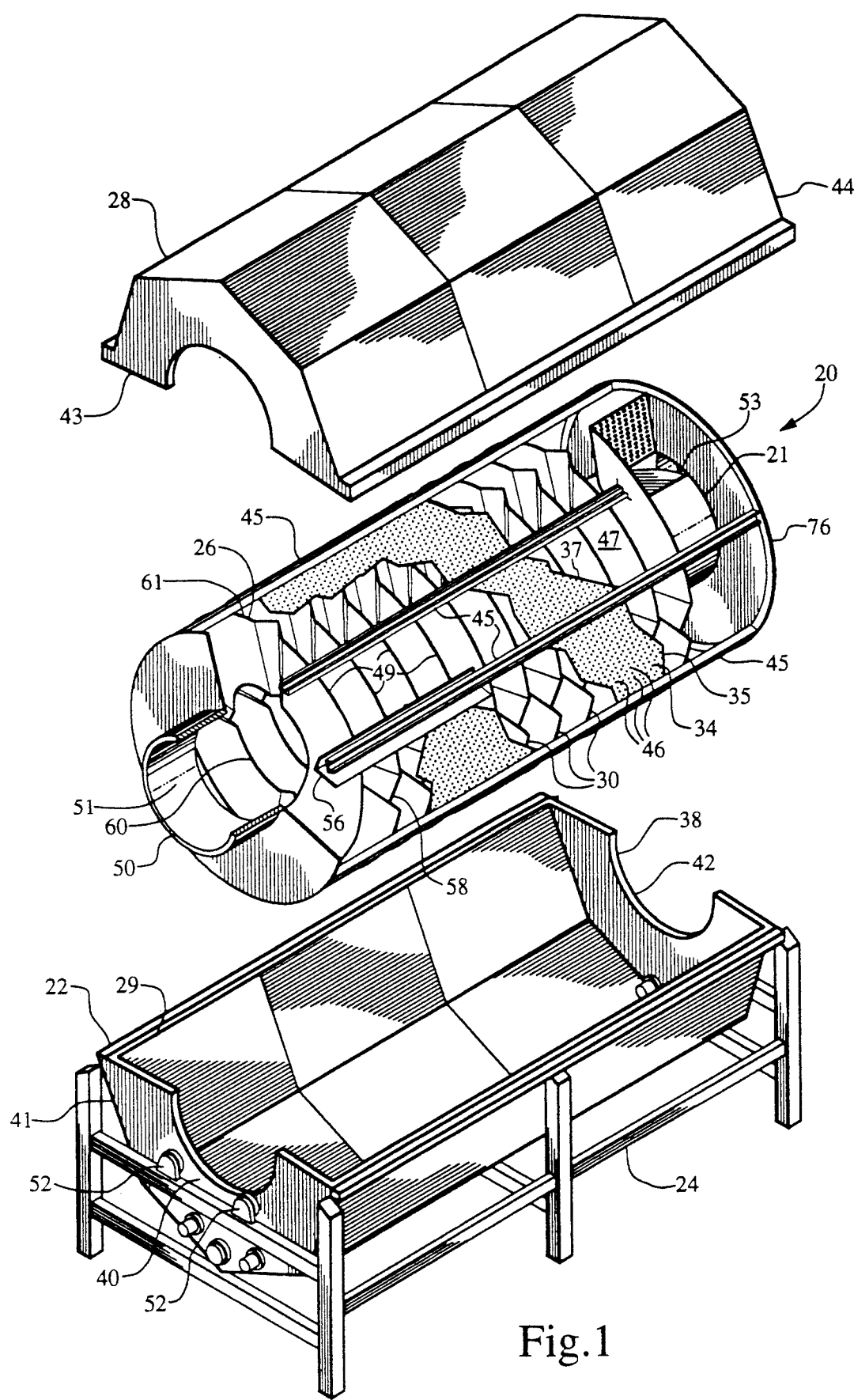
FIG. 1 is an exploded isometric view of a cooler of the present invention employing an axially agitating auger.

Referring more particularly to FIGS. 1-6, wherein like numbers refer to similar parts, a cooler 20 is shown in FIG. 1. An exemplary food processing apparatus employing the axially agitating auger of this invention is the cooler 20, shown in FIG. 1. The cooler 20 has an elongated open top tank 22 which is supported by a frame 24. An axially agitating auger 26 is longitudinally mounted within the tank 22 and an elongated vaulted cover 28 fits over and covers the tank 22. The tank has a semi-cylindrical wall 29 with drains located at its lowest portion.

The auger 26 is rotatably mounted within the tank 22 and has stainless steel flights 30. A perforated cylinder 34 encloses the auger 26 and is formed of a plurality of screens 35, 37. The screens are preferably mounted to structural C-channel members 45. The screens 35, 37 are preferably formed of stainless steel and have a multiplicity of small holes 46 which allow water contained within the tank to enter the cylinder. Alternating screens 35 are fixed such as by welding to the members 45, and other screens 37 are held in place for convenient removal to clean out the interior of the cylinder 34. The perforated cylinder 34 contains the food product 36 being conveyed by the auger 26.

Figure 2:
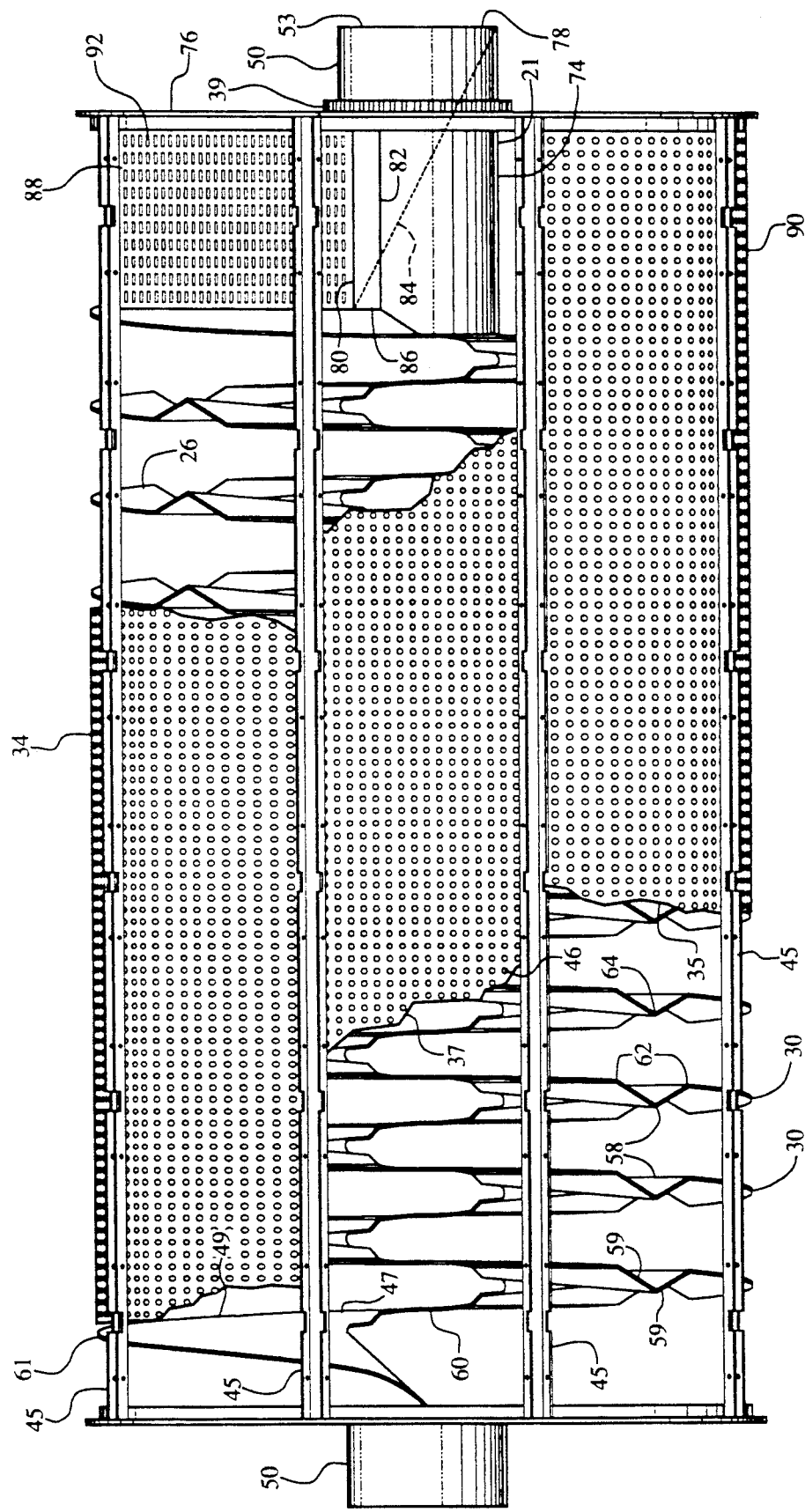
FIG. 2 is a side elevational view, partially broken away of the rotatable drum and auger of FIG. 1, the intermediate peripheral lifting baffles have been omitted for clarity.

The cylinder 34 and auger 26 are driven by a motor (not shown) which engages a drum drive sprocket 39, shown in FIG. 2. The drive sprocket 39 is fixed to the cylinder 34 and is driven by the motor at a rate selected to achieve the desired residence of the food product within the cooler 20.

As the auger 26 rotates, its flights 30 move the food product 36 being treated from the inlet end 40 to the discharge end 38 of the tank 22. The end walls 41, 42 of the tank and the end walls 43, 44 of the cover 28 form holes through which tube journals 50 extend.

The tube journals 50 extend from the an inlet opening 51 and the discharge opening 53 of the cylinder 34. The cylinder 34 is mounted rotatably with the tank 22 so that water contained in the tank will enter the cylinder. Food product is introduced into the inlet opening 51 of the cylinder, and discharged through the discharge opening 53 of the cylinder. The food product 36 may be contained in pouches 54 which may have a capacity up to two gallons.

The tube journals 50 and the auger 26 itself are supported at both ends of the tank 22 by trunions 52 which are mounted to the frame 24 to support the journals 50 in a conventional manner such that the journals 50 do not make contact with the walls 42, 44 of the tank 22 or cover 28.

The vaulted cover 28 may be hingedly attached to the tank 22 so that it may be opened from either side of the cooler as in the manner disclosed in U.S. Pat. No. 4,788,476 to Zittel, the disclosure of which is hereby incorporated herein by reference, or the cover 28 may be attached to the tank 22 in any conventional manner.

Figure 3:
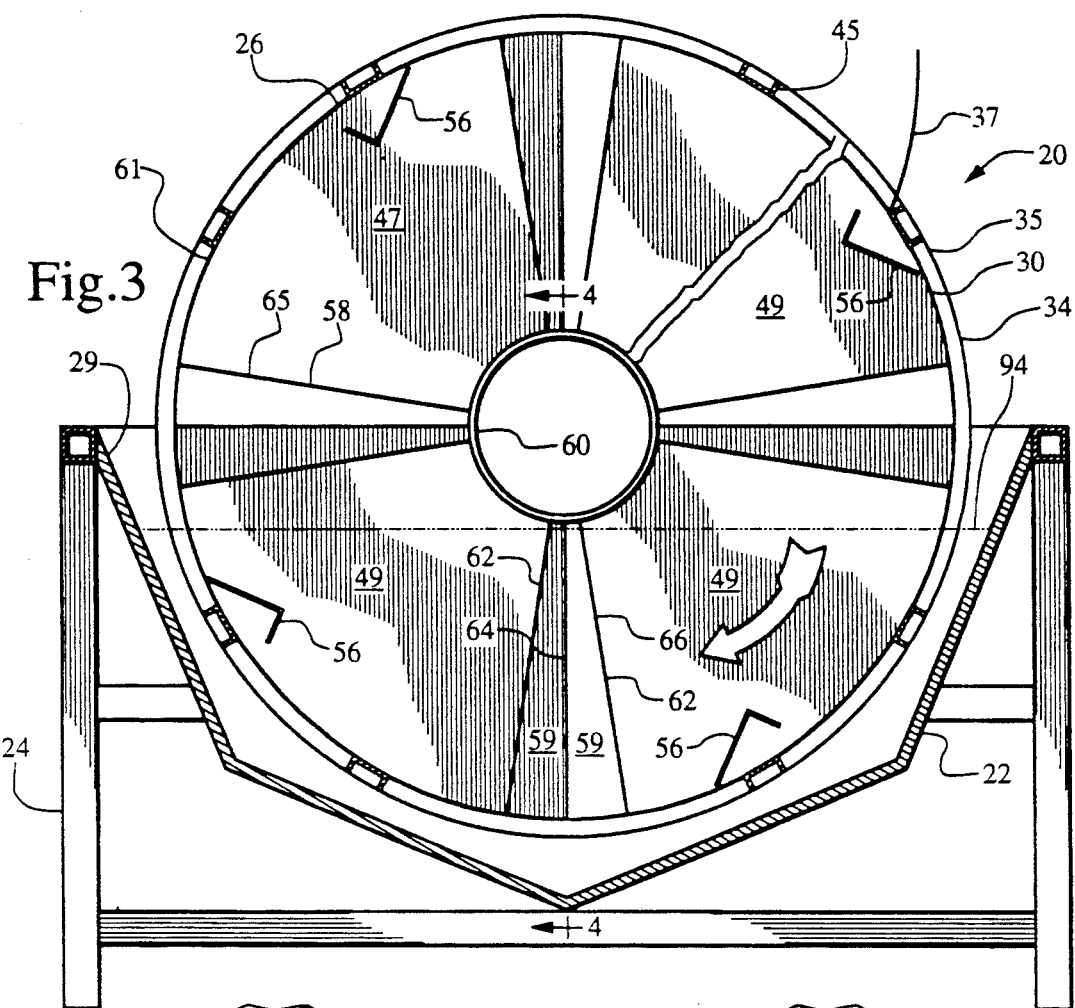
FIG. 3 is a cross-sectional view of the drum of FIG. 2 taken along section line 3—3 and shown in place within a water-filled tank.

The stainless steel flights 30 of the auger 26 define a helical surface 47 which extends toward the discharge end 38 of the cooler 20 such that when the auger 26 is rotated clockwise as looking toward the outlet, as shown in FIG. 3, the food product contained within the cylinder 34 is engaged against the helical surface 47 and propelled by the auger flights 30 toward the discharge end 38.

To axially agitate the food product 36, which may be contained within a pouch 54, the helical surface 47 of the auger 26 is interrupted by a number of projections or waves 58 which project axially from helical segments 49 which define the helical surface 47. Each wave 58 extends from the inner periphery 60 of the auger 26 to the outer periphery 61 of the auger 26, and may be curved or compound, but in a simple form, each wave comprises two planar inclined walls 59 which are joined to each other at a radial peak 64 and which are joined to the helical surface portions 47 of the auger at two radial edges 62.

Figures 4, 5:
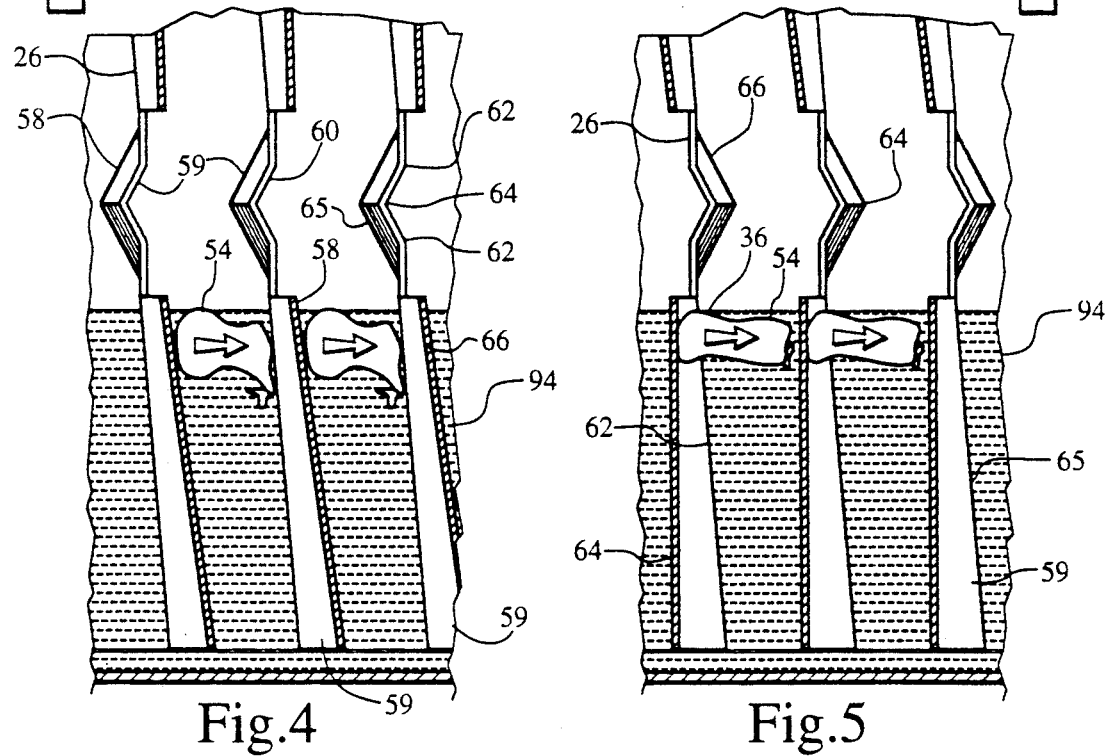
FIG. 4 is a fragmentary cross-sectional view of the cooler of FIG. 3, taken along section line 4—4.
FIG. 5 is a fragmentary cross-sectional view of the cooler of FIG. 4 with the drum displaced angularly by 90 degrees.

The waves 58 may be conveniently formed on the helical auger prior to installation within the cylinder by bending the segments which form the auger 26 on a brake press. The edges 62 and the peak 64 of each wave extends from the center of the helix along a radius. In a preferred embodiment, each wave wall 59 is six inches wide at the outer periphery 61 of the auger, and the peak projects approximately three inches above the edges 62 at the outer periphery. The wave tapers towards the center of the helical auger surface, with the width of the wave walls 59 decreasing, and the height of the peak projection also decreasing to a minimum which will depend upon the radial location of the inner periphery 60. The walls 59 of the projecting wave each form an obtuse angle with the helical surface 47 of the auger 26. The tapering is best shown in FIG. 4. The waves are preferably spaced regularly along the helical surface, with a wave positioned with a peak 64 every 90° around the auger 26.

As shown in FIGS. 4 and 5, among adjacent waves, one wave 65 projects toward the inlet end 40 of the apparatus and the next wave 66 projects toward the discharge end 38. To provide an intensity of agitation, the auger flights 30 are arrayed on a narrow pitch of approximately ten inches, that is, the auger covers a complete turn in an axial length of ten inches.

The waves 58 will engage against a pouch 54 no matter where it is floating within the tank, so it will be effectively agitated regardless of its relative buoyancy. As the cylinder 34 is rotated, food product 36 or pouches 54 residing within the water 94 in the tank will be engaged by the helical surface 47 and advanced towards the discharge end. However, as the helical portion of the auger 26 rotates out of engagement with the pouch, a wave 58 projection will come into engagement with the pouch. If the wave projects toward the discharge end of the apparatus, as shown in FIG. 4, the product will ride up one of the wave walls 59 and then will ride down the other. If the wave projects toward the inlet end of the apparatus, as shown in FIG. 5, the product will first ride down a wave wall 59, then will ride up the other. The effect of this repeated movement is to agitate and massage the product or pouch, promoting interior portions of the pouched product into closer contact with the water and hence to more ready heat transfer thereto. The food product is thus agitated in an axial direction as it is conveyed from the tank inlet to the tank outlet.

To further agitate the food product, in particular in instances where the apparatus 20 may be employed with nonbuoyant pouches, the cooler 20 is preferably provided with lifting baffles 56, shown in FIG. 3, and omitted from FIG. 2 for clarity. The baffles 56 extend approximately six inches inwardly from the screen of the perforated cylinder 34. Each baffle extends flight-to-flight between two adjacent flights 30 of the auger 26. Each planar baffle 56 is inclined away approximately 70° from the radial direction. In other words, each lifting baffle 56 is inclined approximately 20° above a plane tangent to the perforated cylinder 34 at the base of the baffle 56.

As best shown in FIG. 3, each lifting baffle 56 is adjacent to the perforated cylinder 34 at its leading edge as the cylinder rotates. Thus, each lifting baffle 56 gently scoops up food product 36 within the water 94 disposed within the tank 22 and conveys that food product 36 sidewardly across the width of the auger 26. As the baffles 56 leave the water 94 the inclination of the baffles becomes more nearly vertical allowing the conveyed food product 36 to slide off the baffle 56 without suffering damage. Each baffle 56 is separated 90° from its neighboring baffles. The baffles 56 are accessible through the removable screen clean-out doors 37 to occasionally clear away debris which may collect beneath the baffles 56.

The food product is advanced through the drum cylinder 34 by the auger 26 until the food product reaches the discharge end region 38, shown in FIG. 2. The auger 26 terminates at a point spaced from the discharge end plate 76 of the cylinder. Conventional lifting buckets may extend between the auger and the discharge end plate 76. However, in applications in which particular care must be taken not to damage the processed food product, as for example in handling bagged or pouched products, a single scoop discharge 21 may be employed.

The discharge 21 has a semi-cylindrical chute 74 which is fixed to the cylinder 34. The chute 74 extends between the auger 26 and the discharge end plate 76 of the cylinder 34. The chute 74 has a discharge opening 78 which communicates with the discharge opening 53 of the cylinder 34 in the discharge end plate 76. The chute 74 has an inclined surface 84 which extends from the rear wall 86 of the chute to the discharge opening 78. The discharge 21 has a single lifting flight 88 which extends between the side wall 90 of the cylinder 34 and the chute 74. The lifting flight 88 has a perforated base plate 92 which is welded to one lip 82 of the chute along the chute inlet opening 80. The discharge 21 elevates a food product from the water filled portions of the drum to the discharge outlet of the discharge end plate.

Figure 6:
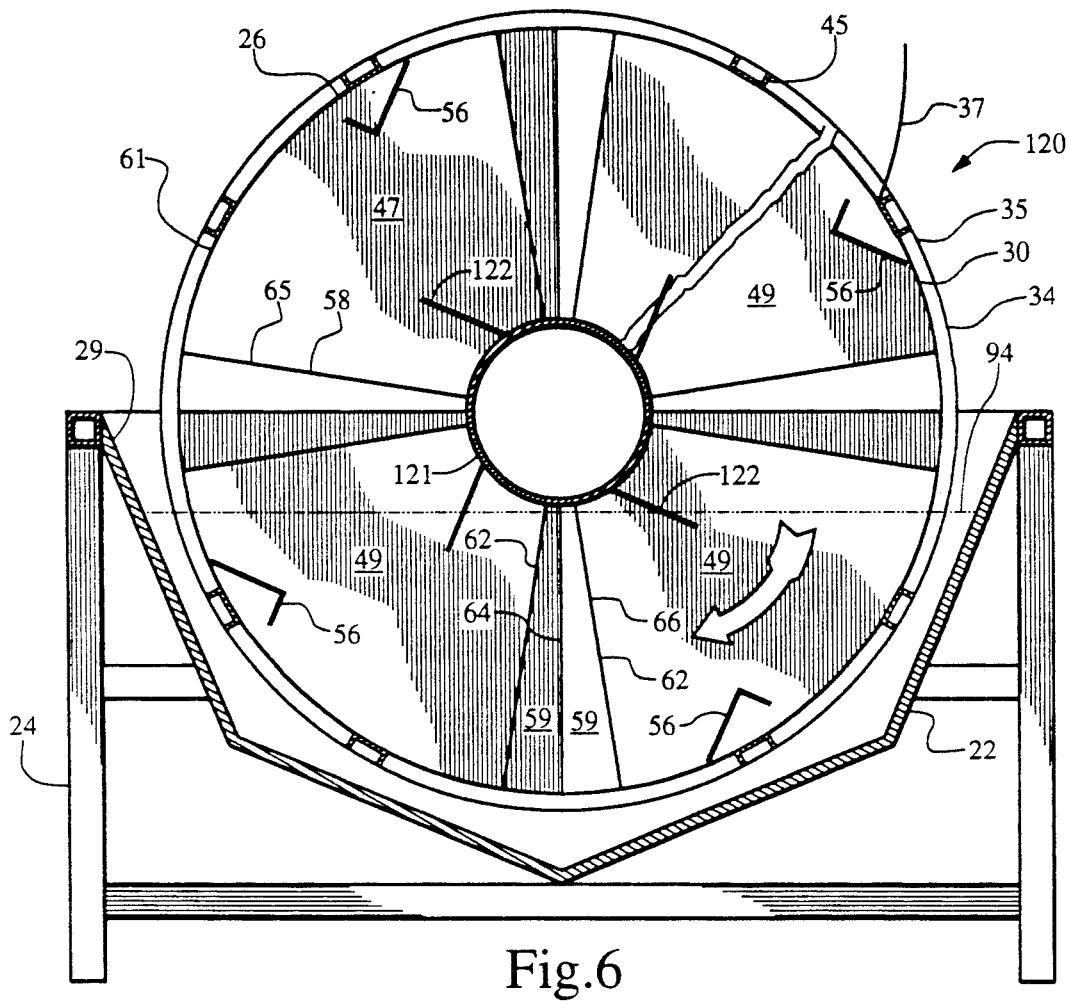
FIG. 6 is a cross-sectional view of an alternative embodiment food processing apparatus of this invention having radially outwardly extending lifting baffles.

An alternative embodiment apparatus 120 of this invention is shown in FIG. 6. The cooler or blancher 120 is identical to the blancher 20 with the addition of a central core 121 which extends axially the length of the auger 26 and a four agitating baffles 122 which extend in a radially outward direction from the core 121. The core 121 is a cylindrical tube which is fixed to the cylinder 34 and rotates along with the cylinder. The inner baffles 122 extend between adjacent auger flights 30 and are positioned to engage against floating pouches or food product. As the baffles 122 rotate with the cylinder 34, each baffle periodically engages against a pouch 54 and pushes it downward into the water 94. Once a baffle 122 has passed over a pouch it bobs up to its original level in the water. In this way the contents of the pouch are massaged and agitated vertically. Such structure may be utilized together with the waves 58 or may be used in an apparatus which does not have waves.

It should be noted that the blancher or cooler of this invention may be formed from other corrosion resistant materials in addition to stainless steel and that the number and angle of the auger flights may be varied as desired. Furthermore, the number of support member channels may vary depending on the overall dimensions of the drum.

It should be further noted that although the projecting waves of the auger have been disclosed as biplanar, they may be formed as curved or multiplanar projections. Furthermore, the apparatus of this invention may also serve as a blancher or cooker if water of proper temperature is introduced thereto.

It is understood that the invention is not confined to the particular construction and arrangement of parts herein illustrated and described, but embraces all such modified forms thereof as come within the scope of the following claims.

I claim:

1. A food processing apparatus, comprising:
  a) a tank having an inlet end and a discharge end;
  b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;
  c) an auger positioned substantially within the perforated cylinder to rotate with the cylinder, the auger having portions which define a helical surface which extends from a position proximate the tank inlet end to a position proximate the tank outlet end; and
  d) portions of the auger which project axially from the helical surface, such that food product conveyed by the rotating auger is engaged by the projecting portions and is thereby agitated in an axial direction as it is conveyed from the tank inlet to the tank outlet.

2. The food processing apparatus of claim 1 wherein a plurality of projections are formed on the auger which project axially from the helical surface, the projections being spaced regularly along the auger helical surface.

3. The food processing apparatus of claim 1 wherein a first projecting portion extends from the auger helical surface axially toward the inlet end of the tank, and a second projecting portion extends from the auger helical surface axially toward the outlet end of the tank.

4. The food processing apparatus of claim 1 wherein the axially projecting auger portions have a first side wall which extends at an obtuse angle from the helical surface and joins a second side wall at an angle, said second side wall rejoining the helical surface at an obtuse angle.

5. The food processing apparatus of claim 1 further comprising:
  a) a central cylindrical core which extends axially within the auger; and
  b) a baffle which extends radially outwardly from the core, wherein the baffle extends into water within the tank to engage against and periodically depress buoyant food product within the tank.

6. In a food processing apparatus having a tank having an inlet end and a discharge end and a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom, wherein the improvement comprises:
  an auger mounted within the cylinder to rotate with the cylinder, the auger having a plurality of helical segments which extend around the cylinder axis, and wherein two neighboring helical segments are joined by a projecting segment which projects axially from the two neighboring helical segments, such that food product introduced into the cylinder is advanced by rotation of the auger from the tank inlet end to the tank outlet end, and wherein the projecting segments are positioned to engage the advancing food product and agitate said food product in an axial direction to facilitate heat transfer between the food product and the water contained in the tank.

7. The food processing apparatus of claim 6 wherein a first projecting segment extends towards the tank inlet end from two neighboring helical segments, and a second projecting segment extends towards the tank outlet end from two neighboring helical segments.

8. The food processing apparatus of claim 6 further comprising a plurality of baffles which extend radially within the auger, wherein a baffle extends into water within the tank to engage against and periodically depress buoyant food product within the tank.

9. A cooler for food product contained within flexible pouches, comprising:
  a) a tank having an inlet end and a discharge end;

b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;

c) an auger positioned substantially within the perforated cylinder to rotate with the cylinder, wherein the auger has a plurality of segments which define portions of a helical surface, and portions of the auger project axially from the helical surface, and each projecting portion connects two helical surface segments, such that pouches conveyed by the rotating auger are engaged by the projecting portions thereby agitated in an axial direction as they are conveyed from the tank inlet to the tank outlet.

10. The food processing apparatus of claim 9 wherein a first projecting portion extends from between two auger helical segments axially toward the inlet end of the tank, and a second projecting portion extends from the between two auger helical segments axially toward the outlet end of the tank.

11. The food processing apparatus of claim 9 wherein the axially projecting auger portions have a first side wall which extends at an obtuse angle from a helical segment and joins a second side wall at an angle, said second side wall joining another helical segment at an obtuse angle.

12. A food processing apparatus, comprising:

a) a tank having an inlet end and a discharge end;

b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;

c) an auger positioned substantially within the perforated cylinder to rotate with the cylinder, the auger having portions which define a helical surface which extends from a position proximate the tank inlet end to a position proximate the tank outlet end; and d) a central cylindrical core which extends axially within the auger; and e) a baffle which extends outwardly from the core, wherein the baffle extends into water within the tank to engage against and periodically depress buoyant food product within the tank, to thereby agitate food product within the tank and promote heat transfer between the water and the food product.

* * * * *